United States Patent

Ooka

(10) Patent No.: US 6,721,173 B2
(45) Date of Patent: Apr. 13, 2004

(54) ELECTRONIC APPARATUS COMPRISING A HOUSING INCLUDING A HARD-DISK DRIVE

(75) Inventor: Satoshi Ooka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/298,060

(22) Filed: Nov. 18, 2002

(65) Prior Publication Data

US 2003/0133260 A1 Jul. 17, 2003

(30) Foreign Application Priority Data

Jan. 15, 2002 (JP) .................................. 2002-006427

(51) Int. Cl.$^7$ ................................................ G06F 1/16
(52) U.S. Cl. .................... 361/679; 361/682; 312/223.2; 248/917
(58) Field of Search ................................ 361/679–687, 361/724–727; 312/223.1–223.6; 248/118, 118.1, 118.5, 917–918, 205; 62/259.2

(56) References Cited

U.S. PATENT DOCUMENTS 6,101,088 A * 8/2000 Nakajima et al. ........... 361/686
6,289,678 B1 * 9/2001 Pandolfi ....................... 62/3.2
6,452,791 B2 * 9/2002 Kim ............................ 361/683

FOREIGN PATENT DOCUMENTS

| JP | 7-182068 | 7/1995 |
|---|---|---|
| JP | 2000-182366 | 6/2000 |

* cited by examiner

*Primary Examiner*—Hung Van Duong
(74) *Attorney, Agent, or Firm*—Finnegan, Henderson, Farabow, Garrett & Dunner, L.L.P.

(57) ABSTRACT

The electronic apparatus comprises a housing having a bottom wall, and a functional component contained in the housing. First and second gaps are created between the functional component and the bottom wall. The second gap is larger than the first gap. The functional component is supported in the housing via a supporting member. The supporting member is interposed between the functional component and the bottom wall, and has a first part positioned in the first gap and a second part positioned in the second gap. The second part has lower rigidity than the first part.

19 Claims, 5 Drawing Sheets

ELECTRONIC APPARATUS COMPRISING A HOUSING INCLUDING A HARD-DISK DRIVE

CROSS-REFERENCE TO RELATED APPLICATIONS

This application is based upon and claims the benefit of priority from the prior Japanese Patent Application No. 2002-006427, filed Jan. 15, 2002, the entire contents of which are incorporated herein by reference.

BACKGROUND OF THE INVENTION

1. Field of the Invention

The present invention relates to an electronic apparatus which contains a functional component, such as a hard disk drive, in a housing. The present invention particularly relates to a structure which absorbs pressure applied to the functional component when the housing is deformed.

2. Description of the Related Art

An electronic apparatus, such as a portable computer, comprises a main body and a display unit supported by the main body. The main body comprises a housing. The housing contains functional components, such as a printed wiring board equipped with a CPU, a hard disk drive, and the like. The housing has a flat box-like shape composed of a bottom, a top, and plural peripheral walls. The top of the housing is provided with a palm rest. The palm rest is the part the user puts his/her hands on, and is positioned at a front end part of the housing. The hard disk drive is positioned between the palm rest and the bottom.

The housing of the electronic apparatus is formed to be thin and compact to improve portability.

Thinning of the housing leads to reduction in the thickness of the palm rest, and narrows the gap between the palm rest and the hard disk drive. Therefore, when pressure is applied to the palm rest, for example, the thin palm rest is deformed downwards and collides with the hard disk drive. As a result, the hard disk drive receives the impact, so recorded data may be corrupted.

An information processing apparatus disclosed in Jpn. Pat. Appln. KOKAI Publication No. 7-182068 comprises a housing which includes a disk drive. The housing has a pair of tilt legs. The tilt legs tilt the housing downwards toward the front side. The disk drive is positioned at a front end portion of the housing. The disk drive is contained in the housing, and set in a horizontal attitude when the housing is tilted. A gap is hence created between the bottom and the disk drive. This gap increases toward the front side of the housing.

The gap between the disk drive and the bottom of the housing, however, does not allow the disk drive to sink when downward pressure is applied to the disk drive. The information processing apparatus constructed in the structure as described above consequently cannot prevent the impact on the disk drive.

A portable computer disclosed in Jpn. Pat. Appln. KOKAI Publication No. 2000-182366 comprises a housing including a hard disk drive. The hard disk drive is positioned at a front end portion of the housing, and is supported by the housing via a holder part. The holder part is connected, at its front end, to the housing via two hinges. Two springs are interposed between the rear end of the holder part and the bottom of the housing. The springs push up the rear end of the holder part to set the hard disk drive into a horizontal attitude. Thus, the rear end of the holder part collides with a stopper, keeping the attitude of the holder part constant. The stopper is provided on an upper surface of the housing.

According to this structure, the hard disk drive can revolve in the thickness direction of the housing. The front end of the holder part, however, cannot shift in the thickness direction of the housing because the front end of the holder part is the fulcrum of revolution of the hard disk drive. Consequently, downward pressure cannot be absorbed when it is applied to the front end part of the holder part. Impact affects the hard disk drive and may corrupt recorded data.

BRIEF SUMMARY OF THE INVENTION

Embodiments of the present invention provide an electronic apparatus capable of absorbing pressure via revolution of a functional component when pressure is applied to the functional component from the housing.

An electronic apparatus according to an embodiment of the present invention comprises a housing having a bottom wall, and a functional component contained in the housing. First and second gaps are created between the functional component and the bottom wall. The second gap is larger than the first gap. A supporting member is interposed between the functional component and the bottom wall, to support elastically the functional component in the housing. The supporting member has a first part positioned in the first gap and a second part positioned in the second gap. The second part has lower rigidity than the first part.

In this structure, when pressure which acts to press the functional component toward the bottom wall is applied, the first and second parts of the supporting member are elastically deformed. In addition, the second part is more easily deformed than the first part. The functional component therefore revolves about a fulcrum which is the portion contacting the first part. Thus, the pressure applied to the functional component is absorbed.

Additional embodiments and advantages of the invention will be set forth in the description which follows, and in part will be obvious from the description, or may be learned by practice of the invention. The embodiments and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment of the present invention will now be explained with reference to FIGS. 1 to 4 in which the embodiment is applied to a portable computer.

Figure 1:
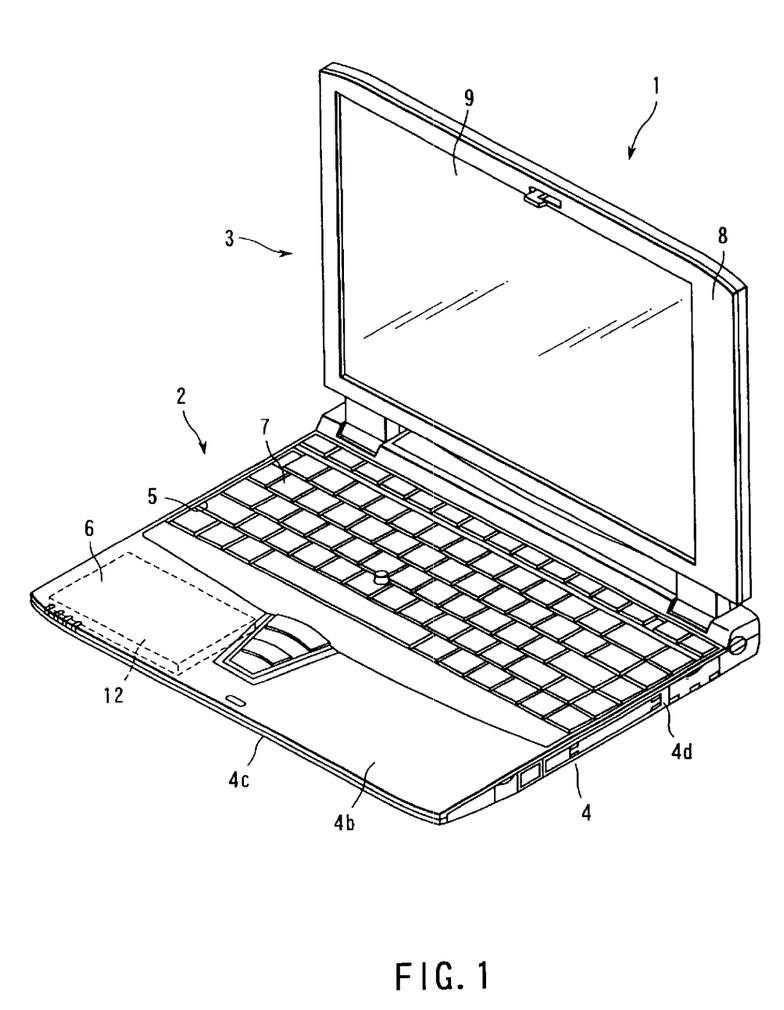
FIG. 1 is a perspective view of a portable computer according to a first embodiment of the present invention.

FIG. 1 shows a portable computer 1 as an electronic apparatus. The portable computer 1 comprises a main body 2 and a display unit 3. The main body 2 includes a housing 4 having a flat box-like shape. The housing 4 has a bottom wall 4a, a top wall 4b, a front wall 4c, left and right side walls 4d, and a rear wall (not shown).

The top wall 4b includes a keyboard receiving part 5 and a palm rest 6. The keyboard receiving part 5 is positioned near the center of the top wall 4b. A keyboard 7 is set in the keyboard receiving part 5. The palm rest 6 allows the user to put his/or her hands on the palm rest 6 when the user operates the keyboard 7. The palm rest 6 is positioned in front of the keyboard, and extends in the widthwise direction of the housing 4.

The display unit 3 includes a display housing 8 and a display panel 9 contained in the display housing 8. The display housing 8 is supported on the rear end part of the housing 4 via a hinge not shown. The display unit 3 can therefore rotate between a closed position and an opened position. In the closed position, the unit 3 is folded covering the palm rest 6 and the keyboard 7 from above. In the opened position, the unit 3 is opened exposing the palm rest 6 and the keyboard 7.

Figure 2:
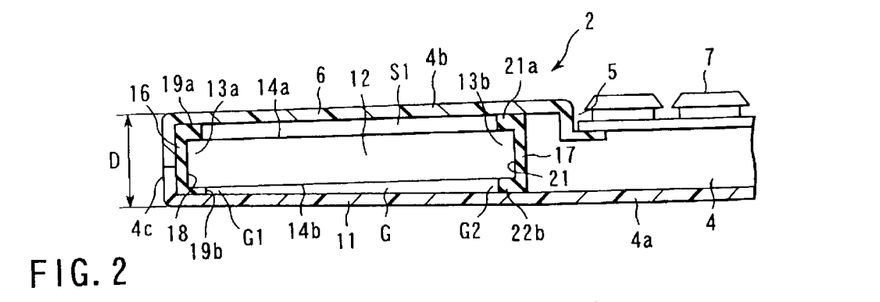
FIG. 2 is a cross-sectional view of a portable computer according to the first embodiment of the present invention, where a hard disk drive is contained inside a housing.

As is shown in FIG. 2, the bottom wall 4a of the housing 4 has a front end part 11 positioned below the palm rest 6. The front end part 11 of the bottom wall 4a is inclined upwards to be closer to the palm rest 6 along the direction toward the front end. Accordingly, lower edges of the front end parts of the side walls 4d of the housing 4 are also inclined upwards along the direction toward the front end.

The thickness dimension D of the housing 4 is therefore minimized at the front end of the housing 4. The housing 4 is thus shaped much thinner where the portable computer 1 is observed from the front side.

The housing 4 contains a hard disk drive 12 as a functional component. The hard disk drive 12 is interposed between the palm rest 6 and the front end part 11 of the bottom wall 4a. The hard disk drive 12 is a flat box-like shape, and includes a front end part 13a as a first end part as well as a read end part 13b as a second end part. The front end part 13a is positioned at the front end of the palm rest 6, opposite the front wall 4c of the housing 4. The rear end part 13b is positioned at the rear end of the palm rest 6.

Further, the hard disk drive 12 has an upper surface 14a and a bottom surface 14b. The upper surface 14a of the hard disk drive 12 is parallel to the palm rest 6. A small gap S1 is created between the upper surface 14a and the palm rest 6. The bottom surface 14b of the hard disk drive 12 faces the front end part 11 of the bottom wall 4a. A gap G is created between the bottom surface 14b and the front end part of the bottom wall 4a.

Since the front end part 11 of the bottom wall 4a is inclined upwards along the direction toward the front end of the housing 4, the gap G increases gradually along the direction from the front end part 13a of the hard disk drive 12 to the rear end part 13. In other words, the front end part 13a of the hard disk drive 12 creates a first gap G1 from the front end part 11 of the bottom wall 4a. Likewise, the rear end part 13b of the hard disk drive 12 creates a second gap G2 from the front end part 11 of the bottom wall 4a. The second gap G2 increases to be larger than the first gap G1 in accordance with the inclination of the bottom wall 4a.

As is shown in FIG. 2, the hard disk drive 12 is supported in the housing 4 via first and second supporting members 16 and 17. The first and second supporting members 16 and 17 are each made of soft elastic material like rubber, holding the hard disk drive 12 horizontal to the housing 4.

Figure 4:
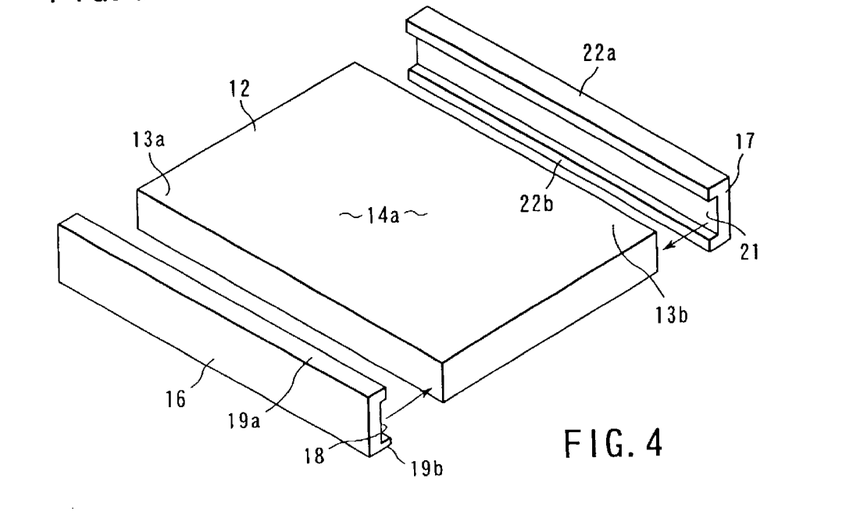
FIG. 4 is a perspective view showing the positional relationship between the hard disk drive and first and second supporting members in the first embodiment of the present invention.

As is shown in FIG. 4, the first supporting member 16 extends throughout the whole length of the front end part 13a of the hard disk drive 12. The first supporting member 16 has a recess 18, an upper end part 19a, and a lower end part 19b (first part). The front end part 13a of the hard disk drive 12 is engaged in the recess 18. The upper end part 19a is interposed in the gap S1 between the upper surface 14a of the hard disk drive 12 and the palm rest 6. The lower end part 19b (first part) is interposed in the first gap G1 between the bottom surface 14b of the hard disk drive 12 and the bottom wall 4a. The upper end part 19a of the first supporting member 16 is formed with thickness which fills the gap S1. The lower end part 19b of the first supporting member 16 is formed with thickness which fills the first gap G1. The first supporting member 16 thus elastically supports the front end part 13a of the hard disk drive 12 in the housing.

The second supporting member 17 extends throughout the whole length of the rear end part 13b of the hard disk drive 12. The second supporting member 17 has a recess 21, an upper end part 22a, and a lower end part 22b (second part). The rear end part 13b of the hard disk drive 12 is engaged in the recess 21. The upper end part 22a is interposed in the gap S1 between the upper surface 14a of the hard disk drive 12 and the palm rest 6. The lower end part 22b (second part) is interposed in the second gap G2 between the bottom surface 14b of the hard disk drive 12 and the bottom wall 4a. The upper end part 22a of the second supporting member 17 is formed with thickness which is fills the gap S1. The lower end part 19b of the second supporting member 17 is formed with thickness which fills the second gap G2. The second supporting member 17 thus elastically supports the rear end part 13b of the hard disk drive 12 in the housing. The lower end part 22b of the second supporting member 17 has a larger thickness dimension than the lower end part 19b of the first supporting member 16.

Rubber material which forms the second supporting member 17 is softer, i.e., has a smaller elastic modulus than the first supporting member 16. As a result, the second supporting member 17 has features of lower rigidity and easier deformation than the first supporting member 16.

Figure 3:
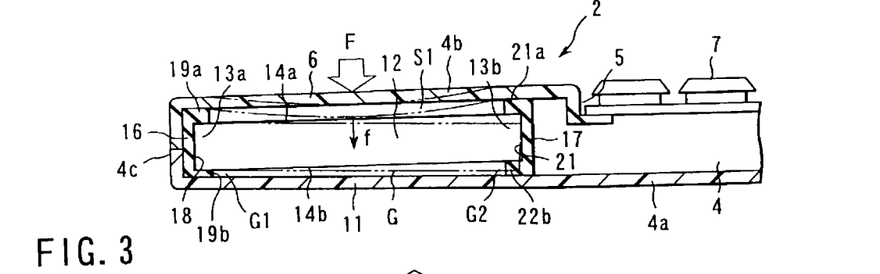
FIG. 3 is a cross-sectional view of a portable computer according to the first embodiment of the present invention, where the hard disk drive is displaced when pressure is applied to a palm rest of the housing.

FIG. 3 shows a state where downward pressure F is applied to the palm rest 6 of the housing 4. If the pressure F is applied to a central part of the palm rest 6, the palm rest 6 is deformed expanding downwards as indicated by a two-dot-chain line in the figure. When the deformation amount of the palm rest 6 exceeds the gap S1, the palm rest 6 collides with the upper surface 14a of the hard disk drive 12, applying downward pressure f to the hard disk drive 12.

As the hard disk drive 12 receives the downward pressure f, the lower end part 19b of the first supporting member 16 and the lower end part 22b of the second supporting member 17 are each deformed to be squashed. The hard disk drive 12 accordingly sinks absorbing the pressure f. The first supporting member 16 is more difficult to deform due to higher rigidity than the second supporting member 17. In addition, the thickness dimension of the lower end part 19b is smaller than that of the lower end part 22b. As a result, the hard disk drive 12 revolves downwards about a fulcrum which is the contact portion where the drive 12 contacts the lower end part 19b, at the time when the deformation of the lower end part 19b reaches a limit.

The lower end part 19b of the first supporting member 16 and the lower end part 22b of the second supporting member have respectively different thickness dimensions. In accordance with the downward revolution, the deformation amount of the lower end part 22b which has a greater thickness dimension exceeds the deformation amount of the lower end part 19b which has a smaller thickness dimension. As a result, the hard disk drive 12 is inclined to be positioned along the front end part 11 of the bottom wall 4a in the housing 4, as is indicated by the two-dot-chain line in FIG. 3.

As described above, the hard disk drive 12 sinks following the deformations of the lower end parts 19b and 22b of the first and second supporting members 16 and 17, up to a constant pressure f. Beyond the constant pressure f, the hard disk drive 12 absorbs the pressure f, revolving about a fulcrum which is the contact portion where the drive 12 contacts the lower end part 19b of the supporting member 16. The hard disk drive 12 thus does not receive forcible load, so the impact resistance of the drive 12 is improved.

In the first embodiment described above, the first and second supporting members 16 and 17 are separate members which are independent from each other. The present invention, however, is not limited to this embodiment. For example, the lower end part 19b of the first supporting member 16 and the lower end part 22b of the second supporting member 17 may be connected to each other, so that outer peripheral parts of the bottom surface 14b are surrounded by the first and second supporting members 16 and 17.

Figure 5:
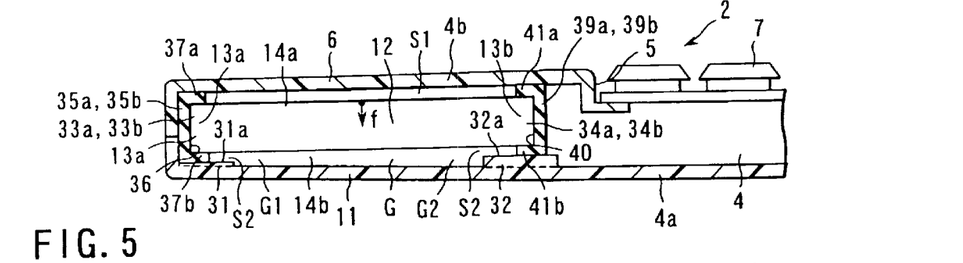
FIG. 5 is a cross-sectional view of a portable computer according to a second embodiment of the present invention, where a hard disk drive is contained inside a housing.
Figure 6:
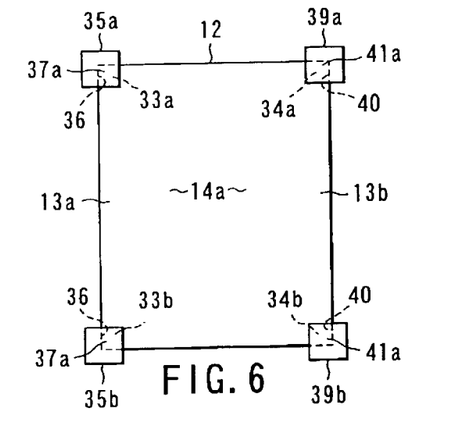
FIG. 6 is a plan view schematically showing the positional relationship between the hard disk drive and first and second supporting members, in the second embodiment of the present invention.

Also, the present invention is not particularly specified to the first embodiment described above. FIGS. 5 and 6 show a second embodiment of the present invention. The second embodiment differs from the first embodiment in the structure of elastically supporting the hard disk drive 12. The other structural features of the portable computer 1 are the same as those of the first embodiment.

In the second embodiment, first and second seats 31 and 32 are integrally formed on the front end part 11 of the bottom wall 4a of the housing 4. The first seat 31 is at the position corresponding to the front end part 13a of the hard disk drive 12. The seat 31 projects upwards from the inner surface of the bottom wall 4a. The second seat 32 is at the position corresponding to the rear end part 13b of the hard disk drive 12. The second seat 32 projects upwards from the inner surface of the bottom wall 4a. The second seat 32 projects more from the inner surface of the bottom wall 4a than the first seat 31. The first and second seats 31 and 32 have flat supporting surfaces 31a and 32a at their upper ends, respectively. These supporting surfaces 31a and 32a are positioned in one same plane parallel to the palm rest 6. Therefore, an equal gap S2 is created between the bottom surface 14b of the hard disk drive 12 and each of the supporting surfaces 31a and 32a.

As is shown in FIG. 6, the front end part 13a of the hard disk drive 12 has a pair of corner portions 33a and 33b. The pair of corner portions 33a and 33b are positioned above the supporting surface 31a and are apart from each other in the widthwise direction of the housing 4. Likewise, the rear end part 13b of the hard disk drive 12 has a pair of corner portions 34a and 34b. The corner portions 34a and 34b are positioned above the supporting surface 32a and are apart from each other in the widthwise direction of the housing 4.

The corner portions 33a and 33b at the front end of the hard disk drive 12 are supported in the housing 4 via first supporting members 35a and 35b, respectively. The first supporting members 35a and 35b are made of soft elastic material like rubber. The first supporting members 35a and 35b each have a recess 36, an upper end part 37a, and a lower end part 37b. The corner portions 33a and 33b of the hard disk drive 12 are engaged in the recesses 36. The upper end parts 37a are interposed in the gap S1 between the upper surface 14a of the hard disk drive 12 and the palm rest 6, as well as the lower end parts 37b in the gap S2 between the bottom surface 14b of the hard disk drive 12 and the supporting surface 31a. The upper end parts 37a of the first supporting members 35a and 35b are formed with thickness which fills the gap S1. The lower end parts 37b of the first supporting members 35a and 35b are formed with thickness which fills the gap S2.

Corner portions 34a and 34b at the rear end of the hard disk drive 12 are supported in the housing 4 via second supporting members 39a and 39b, respectively. The second supporting members 39a and 39b are made of soft elastic material like rubber. The second supporting members 39a and 39b each have a recess 40, an upper end part 41a, and a lower end part 41b. The corner portions 34a and 34b of the hard disk drive 12 are engaged in the recesses 40. The upper end parts 41a are interposed in the gap S1 between the upper surface 14a of the hard disk drive 12 and the palm rest 6, as well as the lower end parts 41b in the gap S2 between the bottom surface 14b of the hard disk drive 12 and the supporting surface 32a. The upper end parts 41a of the second supporting members 39a and 39b are formed with thickness which fills the gap S1. The lower end parts 41b of the second supporting members 39a and 39b are formed with thickness which fills the gap S2. The thickness dimension of the lower end parts 41b is equal to the thickness dimension of the lower end parts 37b of the first supporting members 35a and 35b.

In the second embodiment, the contact area where the first supporting members 35a and 35b contact the hard disk drive 12 is equal to the contact area where the second supporting members 39a and 39b contact the hard disk drive 12. In addition, the used elastic modulus of the first supporting members 35a and 35b and that of the second supporting members 39a and 39b are different from each other. More specifically, the first supporting members 35a and 35b are made of rubber material with a large elastic modulus which provides the feature of hardness. On the other side, the second supporting members 39a and 39b are made of rubber material with a small elastic modulus which provides the feature of softness.

In this structure, if the hard disk drive 12 receives downward force f, the lower end parts 37b of the first supporting members 35a and 35b are each deformed to be squashed, as well as the lower end parts 41b of the second supporting members 39a and 39b. As a result, the hard disk drive 12 sinks absorbing the pressure f. Further, the first supporting members 35a and 35b which support the front end part 13a of the hard disk drive 12 are harder and less deformable than the second supporting members 39a and 39b which support the rear end part 13b of the hard disk drive 12. The hard disk drive 12 therefore revolves about a fulcrum, which means the contact portions where the drive 12 contact the lower end parts 37b, at the time when the deformations of the lower end parts 37b of the first supporting members 35a and 35b reach a limit.

Accordingly, the hard disk drive 12 sinks following the deformations of the lower end parts 37b and 41b of the first and second supporting members 35a, 35b, 39a, and 39b, up to a constant pressure f. Beyond the constant pressure, the hard disk drive 12 absorbs the pressure f, revolving about a fulcrum, i.e., about the portions contacting the lower end parts 37b of the first supporting members 35a and 35b. The hard disk drive 12 thus receives no forcible load and so achieves improved impact resistance.

Figure 7:
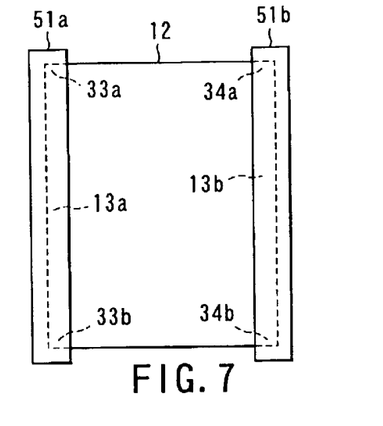
FIG. 7 is a plan view schematically showing the positional relationship between a hard disk drive and first and second supporting members, in a third embodiment of the present invention.

FIG. 7 shows a third embodiment of the present invention. The third embodiment is a modification to the second embodiment.

As shown in FIG. 7, a first supporting member 51a supports the front end part 13a of the hard disk drive 12 in the housing 4. The first supporting member 51a extends throughout the whole length of the front end part 13a, bridging the corner portions 33a and 33b. A second supporting member 51b supports the rear end part 13b of the hard disk drive 12 in the housing. The second supporting member 51b extends throughout the whole length of the rear end part 13b, bridging the corner portions 34a and 34b. These first and second supporting members 51a and 51b have the same sectional shapes as those of the first and second supporting members 35a, 35b, 39a, and 39b in the second embodiment.

Further, the contact area between the first supporting member 51a and the hard disk drive 12 and the contact area between the second supporting member 51b and the hard disk drive 12 are equal to each other. The first supporting member 51a is made of rubber with a large elastic modulus which provides the feature of hardness. In contrast, the second supporting member 51b is made of rubber material with a small elastic modulus which provides the feature of softness.

According to this structure, the first support member 51a which supports the front end part 13a of the hard disk drive 12 is harder and more difficult to deform than the second supporting member 51b which supports the rear end part 13b of the hard disk drive 12. The hard disk drive 12 therefore revolves downwards about a fulcrum, which is the contact portion where the hard disk drive 12 contacts the first supporting member 51a, at the time when the deformation of the first supporting member 51a reaches a limit. Up to a constant pressure f, the hard disk drive 12 thus sinks following the deformations of the first and second supporting members 51a and 51b. Beyond the constant pressure f, the hard disk drive 12 absorbs the pressure, revolving about the fulcrum which is the portion contacting the first supporting member 51a.

Figure 8:
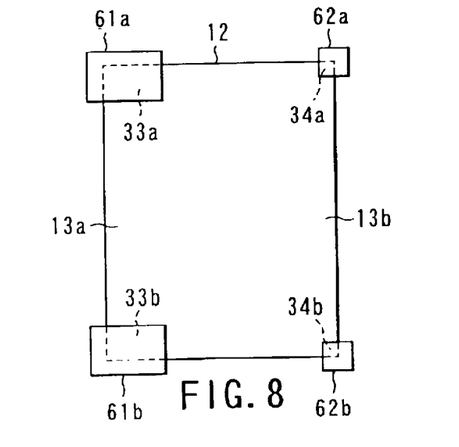
FIG. 8 is a plan view schematically showing the positional relationship between a hard disk drive and first and second supporting members, in a fourth embodiment of the present invention.

FIG. 8 shows the fourth embodiment of the present invention. The fourth embodiment is a further modification of the second embodiment.

As is shown in FIG. 8, first supporting members 61a and 61b are respectively attached to the corner portions 33a and 33b at the front end of the hard disk drive 12, as well as second supporting members 62a and 62b to the corner portions 34a and 34b at the rear end of the hard disk drive 12. The first and second supporting members 61a, 61b, 62a, and 62b are made of soft elastic material like rubber. These first and second supporting members 61a, 61b, 62a, and 62b have an equal elastic modulus. The first and second supporting members 61a, 61b, 62a, and 62b have the same cross-sections as those of the first and second supporting members 35a, 35b, 39a, and 39b of the second embodiment.

Further, the contact area of the first supporting members 61a and 61b and that of the second supporting members 62a and 62b are different from each other. More specifically, the contact area where the first supporting members 61a and 61b contact the hard disk drive 12 is larger than the contact area where the second supporting members 62a and 62b contact the drive 12.

According to this structure, when a downward pressure f is applied to the hard disk drive 12, the first supporting members 61a and 61b receive the pressure f on a broader area than the second supporting members 62a and 62b. On the other side, the second supporting members 62a and 62b receive the pressure f on a smaller area than the first supporting members 61a and 61b. The second supporting members 62a and 62b are deformed more than the first supporting members 61a and 61b. The deformation amount of the second supporting members 62a and 62b exceeds that of the first supporting members 61a and 61b. The hard disk drive 12 therefore absorbs the pressure f, revolving about a fulcrum, which means the contact portions where the hard disk drive 12 contacts the first supporting members 61a and 61b.

Figure 9:
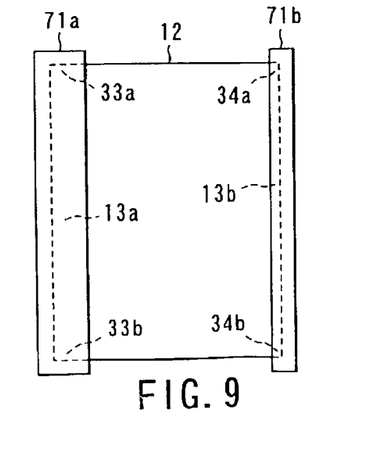
FIG. 9 is a plan view schematically showing the positional relationship between a hard disk drive and first and second supporting members, in a fifth embodiment of the present invention.

FIG. 9 shows the fifth embodiment of the present invention. The fifth embodiment is a further modification of the third embodiment.

As is shown in FIG. 9, a first supporting member 71a supports the front end part 13a of the hard disk drive 12 in the housing 4. The first supporting member 71a extends throughout the whole length of the front end part 13a, bridging the corner portions 33a and 33b. A second supporting member 71b supports the rear end part 13b of the hard disk drive 12. The second supporting member 71b extends throughout the whole length of the rear end part 13b, bridging the corner portions 34a and 34b. These first and second supporting members 71a and 71b have the same cross-sections as those of the first and second supporting members 51a and 51b of the third embodiment.

The first and second supporting members 71a and 71b are made of soft elastic material like rubber. These first and second supporting members 71a and 71b have an equal elastic modulus. Further, the contact area where the first supporting member 71a contacts the hard disk drive 12 is larger than the contact area where the second supporting member 71b contacts the hard disk drive 12.

According to this structure, when a downward pressure f is applied to the hard disk drive 12, the second supporting member 71b receives the pressure f on a smaller area than the first supporting member 71a. The second supporting member 71b is therefore deformed more than the first supporting member 71a. The deformation amount of the second supporting member 71b exceeds that of the first supporting member 71a. The hard disk drive 12 therefore absorbs the pressure f, revolving about a fulcrum which is the contact portion where the hard disk drive 12 contacts the first supporting members 71a.

Figure 10:
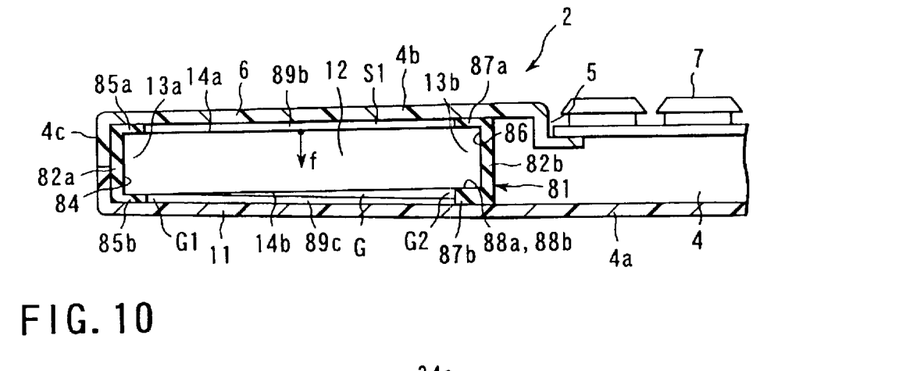
FIG. 10 is a cross-sectional view of a portable computer according to a sixth embodiment of the present invention, where a hard disk drive is contained inside a housing.
Figure 11:
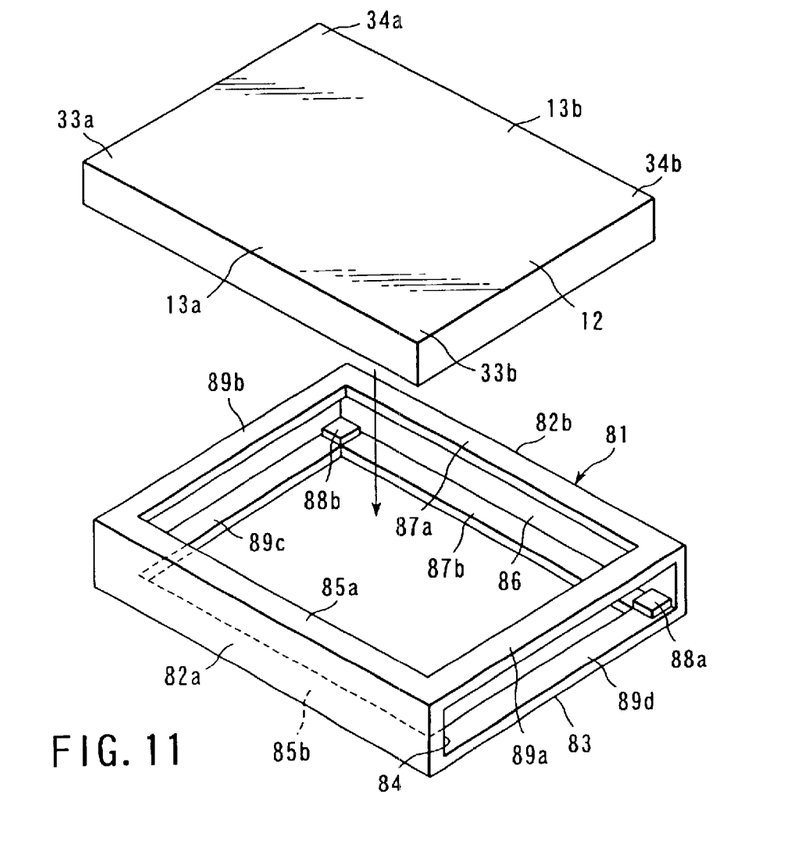
FIG. 11 is a perspective view showing the positional relationship between a hard disk drive and a supporting member in the sixth embodiment of the present invention.

FIGS. 10 and 11 show the sixth embodiment of the present invention. The sixth embodiment differs from the first to fifth embodiments in the structure of supporting elastically the hard disk drive 12 in the housing 4. The other structural features of the portable computer 1 are the same as those of the first embodiment.

As is shown in FIG. 11, the hard disk drive 12 is supported in the housing 4 via one single supporting member 81. The supporting member 81 is made of soft elastic material like rubber, and holds the hard disk drive 12 in an attitude horizontal to the housing 4. The supporting member 81 includes a first part 82a, second part 82b, and link part 83.

The first part 82a of the supporting member 81 extends throughout the whole length of the front end part 13a of the hard disk drive 12, bridging the corner portions 33a and 33b at the front end of the hard disk drive 12. The first part 82a has a recess 84, upper end part 85a, and lower end part 85b. The front end part 13a of the hard disk drive 12 is engaged in the recess 84. The upper end part 85a is interposed in a gap S1 between the upper surface 14a of the hard disk drive 12 and the palm rest 6. The lower end part 85b is interposed in a first gap G1 between the bottom surface 14b of the hard disk drive 12 and the bottom wall 4a. The upper end part 85a of the first part 82a is formed with thickness which fills the gap S1. The lower end part 85b of the first part 82a is formed with thickness which fills the first gap G1. The first part 82a therefore elastically supports the front end part 13a of the hard disk drive 12 in the housing 4.

The second part 82b of the supporting member 81 extends throughout the whole length of the rear end part 13b of the hard disk drive 12, bridging the corner portions 34a and 34b at the rear end of the hard disk drive 12. The second part 82b has a recess 86, upper end part 87a, and lower end part 87b. The rear end part 13b of the hard disk drive 12 is engaged in the recess 86. The upper end part 87a is interposed in the gap S1 between the upper surface 14a of the hard disk drive 12 and the palm rest 6. The lower end part 87b is interposed in a second gap G2 between the bottom surface 14b of the hard disk drive 12 and the bottom wall 4a. The upper end part 87a of the second part 82b is formed with thickness which fills the gap S1. The lower end part 87b of the second part 82b is formed with the same thickness as that of the lower end part 85b of the first part 82a. The thickness dimension of the lower end part 87b is smaller than the second gap G2.

As is shown in FIG. 11, the lower end part 87b of the second part 82b further has a pair of convexes 88a and 88b. The convexes 88a and 88b are positioned on the upper surface of the lower end part 87b opposite to the hard disk drive 12. These convexes 88a and 88b contact the bottom surface 14b of the hard disk drive 12, at positions corresponding to the corner portions 34a and 34b of the hard disk drive 12. The convexes 88a and 88b therefore fill the second gap G2 and links with the lower end part 87b to support elastically the rear end part 13b of the hard disk drive 12 in the housing 4.

The lower end part 85b of the first part 82a contacts the bottom surface 14b of the hard disk drive 12 throughout the whole length of the front end part 13a of the hard disk drive 12. In contrast, the lower end part 87b of the second part 82b contacts the bottom surface 14b of the hard disk drive 12 only on two portions corresponding to the corner portions 34a and 34b of the hard disk drive 12. The contact area where the first part 82a contacts the hard disk drive 12 is larger than the contact area where the second part 82b contacts the hard disk drive 12.

The link part 83 of the supporting member 81 includes first to fourth bridges 89a to 89d. The first and second bridges 89a and 89b connect the upper end part 85a of the first part 82a and the upper end part 87a of the second part 82b. The first and second bridges 89a and 89b are apart from each other in the lengthwise direction of the hard disk drive 12. Similarly, the third and fourth bridges 89c and 89d connect the lower end part 85b of the first part 82a and the lower end part 87b of the second part 82b. These third and fourth bridges 89c and 89d are apart from each other in the lengthwise direction of the hard disk drive 12. The supporting member 81 accordingly surrounds the outer peripheral parts of the hard disk drive 12.

In this structure, the first part 82a which supports the front end part 13a of the hard disk drive 12 has a larger contact area to contact the hard disk drive 12 than the second part 82b which supports the rear end part 13b of the hard disk drive 12. When a downward pressure f is applied to the hard disk drive 12, the first part 82a therefore receives the pressure f on a broader area than the second part 82b. On the other side, the second part 82b receives the pressure f on a smaller area than the first part 82a.

As a result, the second part 82b is deformed more than the first part 82a. The rigidity of the second part 82b decreases to be lower than the first part 82a. The hard disk drive 12 therefore revolves downwards about a fulcrum, which is the portion contacting the first part 82a, to absorb the pressure f. No forcible load is thus applied to the hard disk drive 12, so the impact resistance of the hard disk drive 12 increases.

Figure 12:
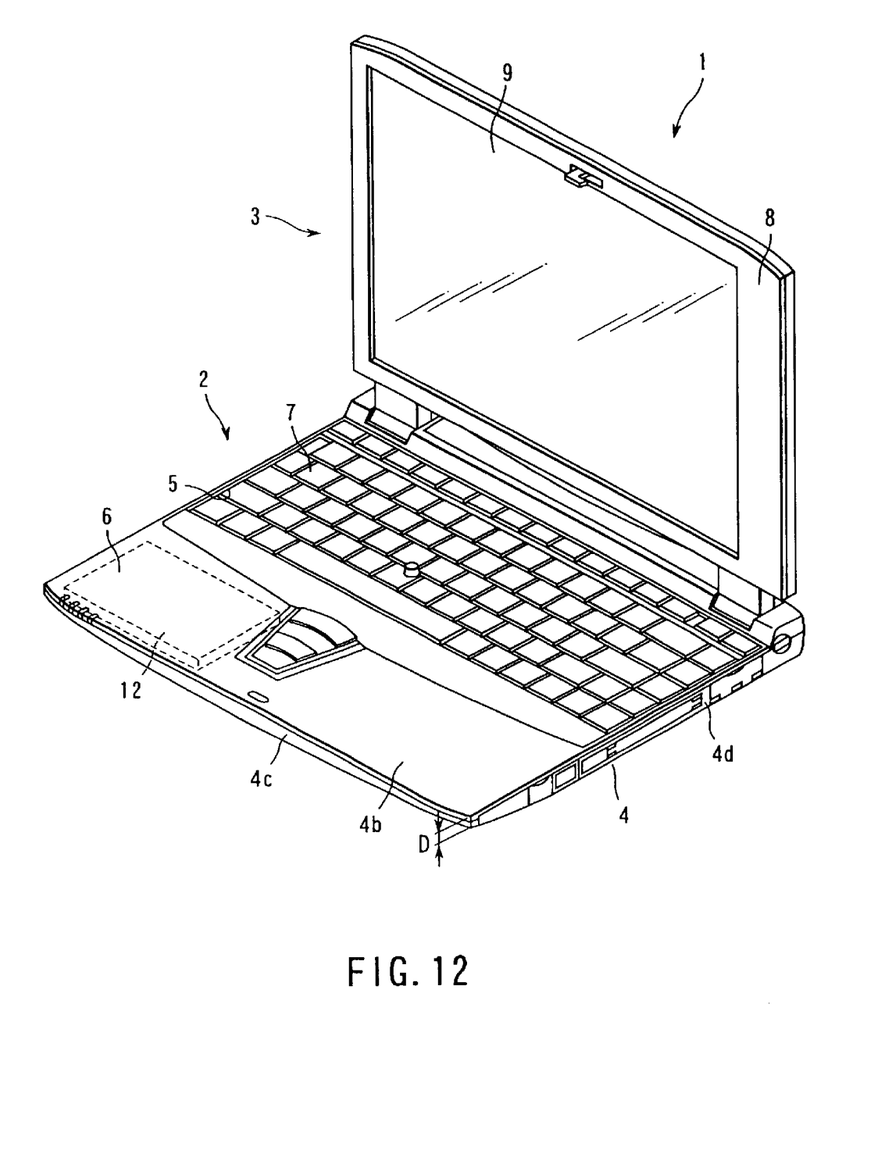
FIG. 12 is a perspective view showing a portable computer according to a seventh embodiment of the present invention.

FIG. 12 shows the seventh embodiment of the present invention.

The seventh embodiment differs from the first embodiment in the shape of the housing 4. The other structural features of the portable computer 1 are the same as those of the first embodiment.

As is shown in FIG. 12, the bottom wall 4a of the housing 4 is inclined to be closer to the palm rest 6, from a widthwise center part of the housing 4 toward both the left and right sides of the housing 4. Accordingly, the front wall 4c of the housing 4 has a lower edge which is inclined upwards, from the center part of the housing 4 toward both the left and right sides along the widthwise direction of the housing 4. The thickness dimension D of the housing 4 is therefore minimum at each of the left and right end parts of the palm rest 6. The housing 4 is thus much thinner where the portable computer 1 is observed from the front side.

The hard disk drive 12 interposed between the palm rest 6 and the front end part 11 of the bottom wall 4a is supported elastically on the interior of the housing 4, for example, via the same first and second supporting members 16 and 17 as those of the first embodiment, or the same supporting member 81 as that of the sixth embodiment.

In the present invention, the functional component to be contained in the housing is not limited to a hard disk drive.

The housing may contain any kind of disk drive which is weak against impact, e.g., a floppy disk drive, optical disk drive, or the like.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An electronic apparatus comprising:
    a housing having a bottom wall;
    a functional component contained in the housing, with first and second gaps created between the functional component and the bottom wall, the second gap being larger than the first gap; and
    a supporting member interposed between the functional component and the bottom wall, to support elastically the functional component in the housing, the supporting member having a first part which is positioned in the first gap and a second part which is positioned in the second gap and has lower rigidity than the first part.

2. The apparatus according to claim 1, wherein the supporting member is made of elastic material like rubber.

3. The apparatus according to claim 1, wherein the area of the second part of the supporting member is smaller than that of the first part.

4. The apparatus according to claim 1, wherein the second part of the supporting member has a larger thickness dimension than the first part.

5. The apparatus according to claim 1, wherein the second part of the supporting member is made of softer material than the first part.

6. The apparatus according to claim 1, wherein the functional component has a first end part and a second end part positioned in the side opposite to the first end part,
    the first end part creates the first gap from the bottom wall,
    the second end part creates the second gap from the bottom wall,
    the first part of the supporting member elastically supports the first end part of the functional component, and
    the second part of the supporting member elastically supports the second end part of the functional component.

7. The apparatus according to claim 1, wherein the housing has a palm rest to put hands on, and the functional component is positioned between the palm rest and the bottom wall.

8. An electronic apparatus comprising:
    a housing having a bottom wall;
    a functional component contained in the housing, with first and second gaps created between the functional component and the bottom wall, the second gap being larger than the first gap;
    a first supporting member interposed in the first gap, to support elastically the functional component in the housing; and
    a second supporting member interposed in the second gap, to support elastically the functional component in the housing, the second supporting member having lower rigidity than the first supporting member.

9. The apparatus according to claim 8, wherein the functional component has a first end part which creates the first gap from the bottom wall, and a second end part which creates the second gap from the bottom wall,
    the first supporting member elastically supports the first end part of the functional component, and the second supporting member elastically supports the second end part of the functional component.

10. The apparatus according to claim 8, wherein the first and second supporting members are each made of elastic material like rubber.

11. The apparatus according to claim 8, wherein the first supporting member and the second supporting member are formed integrally with each other.

12. The apparatus according to claim 8, wherein the housing has a top wall opposite to the bottom wall, and the functional component is interposed between the bottom wall and the top wall.

13. The apparatus according to claim 8, wherein the area of the second supporting member is smaller than the first supporting member.

14. The apparatus according to claim 8, wherein the second supporting member has a larger thickness dimension than the first supporting member.

15. An electronic apparatus comprising:
    a housing having a bottom wall and a top wall arranged close to each other;
    a functional component interposed between the bottom wall and the top wall, contained in a horizontal attitude in the housing, and having a first end part which creates a first gap from the bottom wall, and a second end part which creates a second gap from the bottom wall, the second gap being larger than the first gap;
    a first supporting member interposed in the first gap, to support elastically the first end part of the functional component in the housing; and
    a second supporting member interposed in the second gap, to support elastically the second end part of the functional component in the housing, the second supporting member having lower rigidity than the first supporting member.

16. The apparatus according to claim 15, wherein the area where the first supporting member contacts the functional component is larger than the area where the second supporting member contacts the functional component.

17. The apparatus according to claim 15, wherein the first supporting member has a smaller thickness dimension than the second supporting member.

18. The apparatus according to claim 15, wherein the first supporting member has a larger elastic modulus than the second supporting member.

19. The apparatus according to claim 15, wherein the top wall has a palm rest to put hands on, and the functional component is positioned between the palm rest and the bottom wall.

* * * * *